US005132254A

United States Patent [19]

[11] Patent Number: 5,132,254

[45] Date of Patent: Jul. 21, 1992

Stempin et al.

[54] COATED FIBERS FOR CERAMIC MATRIX COMPOSITES

[75] Inventors: John L. Stempin, Beaver Dams; Dale R. Wexell, Corning, both of N.Y.

[73] Assignee: Corning Incorporated, Corning, N.Y.

[21] Appl. No.: 628,624

[22] Filed: Dec. 17, 1990

[51] Int. Cl.$^5$ .................... C03C 14/00

[52] U.S. Cl. .................... 501/32; 501/8; 501/95; 501/96; 501/99; 501/101; 428/427

[58] Field of Search .................... 501/32, 95, 96, 99, 501/101, 8; 428/427

[56] References Cited

U.S. PATENT DOCUMENTS

| | | | |
|---|---|---|---|
| 4,376,803 | 3/1983 | Katzman | 428/408 |
| 4,376,804 | 3/1983 | Katzman | 428/408 |
| 4,405,685 | 9/1983 | Honjo et al. | 428/368 |
| 4,589,900 | 5/1986 | Brennan et al. | 65/33 |
| 4,615,987 | 10/1986 | Chyung et al. | 501/8 |
| 4,626,515 | 12/1986 | Chyung et al. | 501/32 |
| 4,642,271 | 2/1987 | Rice | 428/693 |
| 4,755,489 | 7/1988 | Chyung et al. | 501/8 |

*Primary Examiner*—William R. Dixon, Jr.
*Assistant Examiner*—Melissa Bonner
*Attorney, Agent, or Firm*—Kees van der Sterre

[57] ABSTRACT

Ceramic matrix composite articles comprising a matrix phase composed of a silicate glass or glass-ceramic and a matrix reinforcement material disposed within the matrix comprising carbon (e.g., graphite) fibers are described, wherein the fibers are provided with a protective boron nitride surface coating. The mechanical properties of the composites at high temperatures are substantially improved.

18 Claims, No Drawings

COATED FIBERS FOR CERAMIC MATRIX COMPOSITES

BACKGROUND OF THE INVENTION

The present invention relates generally to fiber-reinforced composites wherein the matrix consists of a ceramic material. More particularly the invention relates to ceramic matrix composites comprising a matrix composed of an oxide glass or glass-ceramic together with reinforcing fibers composed of carbon, wherein the fibers are protectively coated with boron nitride to improve the properties of the composite products.

Proposed applications for ceramic matrix composites include components for heat engines. Such components must exhibit good strength and toughness at ambient and elevated temperatures in an oxidizing environment.

Fiber-reinforced ceramic matrix composites comprising glass and/or glass-ceramic matrices are well known. U.S. Pat. No. 4,626,515 for example, discloses fiber-reinforced composites wherein the reinforcing fibers are composed of silicon carbide and the reinforced matrix is an essentially alkali-free, alkaline earth aluminosilicate glass. U.S. Pat. Nos. 4,615,987, 4,589,900 and 4,755,489 disclose silicon carbide fiber reinforced glass-ceramic composites wherein the matrix materials consist of an alkaline earth aluminosilicate glass-ceramic composition.

Composites reinforced with silicon carbide fibers such as Nicalon ® fibers excellent strength and toughness at high temperatures. However, these fibers are expensive, and in addition require relatively high composite processing temperatures, typically above 1300° C., to develop the tough fracture behavior which is desired in the composite material. Graphite fibers, on the other hand, while relatively inexpensive, do not offer the high temperature performance characteristics of silicon carbide fibers, being most generally limited in utility to applications wherein composite use temperatures do not exceed about 500° C.

One method of improving fiber performance in metal and ceramic matrix systems has been to apply coatings to the reinforcing fibers prior to incorporating them into the composite material. U.S. Pat. No. 4,397,901, for example, describes a composite article and method for making it wherein the fibers are provided with successive coatings of pyrolytic carbon, diffused silicon, and silicon carbide. U.S. Pat. No. 4,405,685 describes a similar coating system for carbon fibers wherein an inner coating consisting of a mixture of carbon and a selected metal carbide is used, while U.S. Pat. No. 4,642,271 describes the use of boron nitride coatings on silicon carbide or carbon fibers to be used to reinforce selected glass and ceramic matrix materials. U.S. Pat. Nos. 4,376,803 and 4,376,804 describe composite coatings consisting of amorphous carbon with overlayers of a metal oxide such as $SiO_2$ for reinforcing metal alloys.

Notwithstanding the substantial efforts which have been devoted to the development of these coatings, no effective method for improving the high temperature functionality of graphite or other carbon fibers in glass and particularly glass-ceramic matrix materials has yet been developed. Yet a successful method for improving the high temperature performance of carbon fibers in ceramic composites systems could have a very significant commercial impact to the extent that decreases in cost and increases in the range of utility of these materials could be achieved.

It is therefore a principal object of the present invention to provide a method for protecting carbon fibers to be used for ceramic matrix reinforcement from the adverse effects of high temperature processing and use.

It is a further object of the invention to provide coated carbon fiber materials, including coated graphite fiber materials, offering improved high-temperature strengthening and/or toughening performance in ceramic matrix composite systems.

It is a further object of the invention to provide fiber-reinforced glass and glass-ceramic matrix composite products containing coated carbon reinforcing fibers offering improved composite properties at high temperatures.

Other objects and advantages of the invention will become apparent from the following description thereof.

SUMMARY OF THE INVENTION

We have now discovered that the application of boron nitride coatings to carbon fibers such as graphite fibers can significantly improve the strength and toughness of composite products incorporating the fibers, as well as the resistance of the composites to oxidative deterioration at elevated temperatures. Particularly surprising results have been obtained at use temperatures in the 500°-900° C. range, where ultimate failure strengths approaching 100 ksi have been observed in some composite systems.

In one important aspect then, the invention may be characterized in terms of an improved ceramic matrix composite product. That product is a ceramic matrix composite article comprising a matrix phase composed of a silicate glass or glass-ceramic and a matrix reinforcement material disposed within the matrix which includes inorganic reinforcing fibers, at least some of the fibers being composed of carbon. Improved properties in the composite are secured by providing, on at least the carbon fibers present in the composite, a protective boron nitride surface coating.

In a second aspect, the invention may be seen to reside in a method for improving the oxidation resistance of a composite material formed of a glass or glass-ceramic matrix material which contains a matrix reinforcement material including a multiplicity of carbon fibers. Broadly characterized, that method comprises applying a boron nitride surface coating to the surfaces of the carbon fibers, such coating being unexpectedly effective to improve the strength and/or toughness of the composite under stress at high temperatures and under oxidizing conditions.

In yet another aspect, the invention resides in a more general method for protecting carbon components from oxidative deterioration while in proximity with oxide glass or glass-ceramic encapsulating materials at elevated temperatures in oxidizing environments. That method comprises the step of interposing a layer of boron nitride between the carbon component and the oxide glass or glass-ceramic encapsulating material, to reduce oxidative attack on the encapsulated components. Thus, while the invention has particular utility for the production of fiber-reinforced ceramic matrix composites in oxide ceramic systems, it may also be useful for other applications wherein enhanced protection for graphite or other carbon components operating under harsh oxidizing conditions is required.

DETAILED DESCRIPTION

As will be evident from the following description, the invention is not limited to the use of any particular glass or glass-ceramic matrix material, but instead may employ any of the various oxide-based glasses or glass-ceramics employed for the manufacture of ceramic composites in the prior art. These include powdered glasses, such as powdered aluminosilicate glasses or powdered borosilicate glasses, as well as powdered aluminosilicate glasses which are thermally crystallizable to yield refractory glass-ceramic matrices, including $\beta$-spodumene, anorthite, cordierite, or other glass-ceramics.

Silicate glasses useful as matrix materials in the fiber-reinforced composites of the invention include alkali-alkaline earth-silicate glasses, including those commonly known as soda-lime glasses, alkali borosilicate glasses, including heat-resistant borosilicate compositions of the type commercially available as Pyrex® brand glasses, and alkaline earth aluminosilicate glasses of high softening point and low thermal expansion. The preferred glasses from the standpoint of refractoriness are glasses selected from the group consisting of borosilicate, aluminosilicate, and boroaluminosilicate glasses containing up to 25% alkaline earth oxides and not more than 10% alkali metal oxides by weight.

Specific examples of useful glass-ceramic matrix materials include calcium aluminosilicate glass-ceramics wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.Si_2$, and gehlenite ($2CaO.Al_2O_3.SiO_2$).

Another useful family of glass-ceramics includes calcium aluminosilicate glass-ceramics comprising more than about 35% alumina by weight and containing a predominant crystal phase consisting essentially of triclinic anorthite in solid solution with at least one of mullite and alpha alumina. Alternatively, barium- or magnesium-aluminosilicate glass-ceramics having a principal crystal phase selected from the group consisting of barium osumilite, cordierite, and stuffed cordierite wherein a stuffing ion selected from the group of Ba, Sr, Ca and Cs is present can be advantageously used.

Specific examples of glass compositions suitable for use as glass or glass-ceramic matrix materials in accordance with the invention are set forth in Table 1 below. Glass compositions A-D provide highly crystalline glass-ceramic matrix materials on appropriate heat treatment, while glass composition E forms provides a stable non-crystalline glass.

TABLE 1

| Oxide | A | B | C | D | E |
|---|---|---|---|---|---|
| $SiO_2$ | 42.4 | 39.6 | 42.2 | 43.1 | 79.2 |
| $Al_2O_3$ | 37.3 | 38.5 | 22.3 | 22.8 | — |
| CaO | 17.7 | 18.4 | — | — | — |
| $ZrO_2$ | — | 3.0 | 2.9 | 3.0 | — |
| $K_2O$ | .1 | — | 6.2 | 6.3 | 2.4 |
| BaO | — | — | 23.5 | 24.0 | — |
| $B_2O_3$ | 1.0 | 6.0 | 2.0 | — | 18.4 |
| $As_2O_3$ | .5 | .5 | .8 | .8 | — |
| $Nb_2O$ | 1.0 | — | — | — | — |

As previously noted, the present invention has primary utility for the fabrication of glass or glass-ceramic composites wherein graphite reinforcing fibers are used. However, other forms of carbon fibers may alternatively be employed, with expected improvements in performance attributable to the use of the protective boron nitride coatings being similar to those achieved with graphite coatings, as hereafter more fully described.

Of course, matrix reinforcement in the composites of the invention need not be limited to coated carbon fibers alone. Other reinforcing constituents, including inorganic whiskers or chopped fibers, or or even long fibers of other compositions such as silicon carbide, alumina, mullite, or the like, may additionally be included for specific purposes.

The process of coating the fibers to be used for composite reinforcement in accordance with the invention is not critical, and may follow known practice. Boron nitride coatings are best applied by vapor deposition, substantially as described in U.S. Pat. No. 4,642,271 to Rice. As disclosed in that patent, source gases such as boron trichloride or borazine and ammonia are supplied to a deposition chamber and reacted to form boron nitride on the surfaces of the fibers at temperatures below 1000° C., preferably 900°-950° C. Coatings as thin as 0.05 microns and ranging up to micron thickness or higher can be produced by this method.

Boron nitride coatings are available commercially from vendors supplying coating services. The coating source is not critical. We use coatings commercially available from Synterials, Incorporated of Herndon, Va., which may be provided to specified thicknesses. Presently, we employ coatings with thicknesses in the range of 0.1-0.2 microns, made by vapor deposition using a batch CVD reactor and conventional $BCl_3/NH_3$ source gases for BN coating. In the case of graphite fibers, best results are obtained at deposition temperatures in the range of about 900°-950° C. The time for deposition, i.e., the actual deposition interval exclusive of fiber heat-up and cool-down times, is typically in the range of about 10-20 minutes.

The use of coated reinforcing fibers produced as described to make preforms for ceramic matrix composite fabrication follows conventional practice can follow known practice. Customarily, the fibers are infiltrated by immersion into suspensions of powdered glass matrix materials such as those previously described. The coated and infiltrated fibers are then collected on a revolving drum by winding to form a mat of the fiber tow. This mat is then cut from the drum, reshaped into a flat mat (termed a prepreg), and then cut into smaller sheets for stacking, debindering, and consolidation into dense composite products.

The invention may be further understood by reference to the following example detailing the production of a ceramic matrix composite article in accordance therewith.

EXAMPLE

Five oxide glass compositions suitable for the manufacture of ceramic composites comprising glass or glass-ceramic matrices are identified for melting. Batches for each of these compositions, corresponding to glasses A-E reported in Table 1 above, are compounded of conventional glass batch materials and are then melted in platinum or silica crucibles at temperatures of 1550° C. or 1650° C. for 16 hrs. The melts thus provided are then drigaged (poured into water), and the resulting frits are then ball-milled with alumina grinding media to produce glass powders with average particle sizes of about 10 microns.

A graphite fiber tow material, commercially available as Hercules TM AS-4 carbon fiber tow, is next coated with boron nitride by commercial vapor deposition processing. The coatings were applied by Synterials, Incorporated of Herndon, Va. to a specified coating thickness of 0.1–0.2 microns.

The coated fiber tow thus provided is next infiltrated with one of the glass powders disclosed above. Infiltration is carried out by dispersing each glass in a liquid slurry comprising dispersants and organic binders, and then transporting the graphite fiber through the slurry. The slurry composition used for fiber infiltration has a composition consisting, in parts by weight, of about 120 parts of methanol, 1 part of a dispersant, 266 parts of Tamol® 73210 polyvinyl butyral resin, and 200 parts of powdered glass.

Fibers infiltrated with the glass powders as described are collected on a rotating drum, dried, and cut from the drum as a unitary prepreg mat. Smaller prepreg sheets approximately 3×1.5 inches in size are then cut from the mats, and layered in fiber-parallel alignment in twelve-sheet stacks for subsequent consolidation into composite plates.

To carry out the consolidation, the binder is first removed from the sheet stacks by firing to 650° C. for 2 hours in a nitrogen atmosphere. The stacks are then hot pressed in a nitrogen atmosphere under conditions of temperature and pressure sufficient to convert the stacks to dense composite plates. One of three different hot press schedules is selected for the consolidation process, as follows:

Schedule A - heating from room temperature to 1200° C. at a rate averaging about 500° C. per hour with holds of 5 minutes at 850° C. and 10 minutes at 1200° C., followed by cooling at an equivalent rate to room temperature, and with a pressure of 1500 psi being applied at temperatures over 850° C.;

Schedule B - heating from room temperature to 1100° C. at a rate averaging about 500° C. per hour with holds of 5 minutes at 850° C. and 10 minutes at 1100° C., followed by cooling at an equivalent rate to room temperature, and with a pressure of 1500 psi being applied at temperatures over 850° C.; and Schedule C - heating from room temperature to 1365° C. at a rate averaging about 500° C. per hour with holds of 5 minutes at 500° C. and 1 minute at 1365° C., followed by cooling at a rate of about 540° C. per hour to room temperature with a 15 minute annealing hold at 500° C., and with a pressure of 316 psi being applied at temperatures over 500° C.

Consolidation at relatively high temperatures and low pressures, as in Schedule C above, is preferred for glass matrix materials such as Composition E in Table 1, while the lower temperature, higher pressure consolidation treatments of Schedules A and B are used for the glass-ceramic matrix materials.

Consolidated composites produced as described are tested for flexural strength along with identically prepared samples made using uncoated graphite fibers from the same fiber source. Testing is carried out in 4-point flexure using sample bars 3" in length×0.18" in width×0.08" in thickness cut from each plate. Properties are measured both at ambient temperature and at higher temperatures within the anticipated temperature range of use for these materials.

Results from flexural strength tests conducted on graphite-fiber reinforced glass and glass-ceramic matrix composites are reported in Tables 2 and 3 below. Included in Table 2 for each of the samples tested are an identification of the matrix composition used, by reference to the composition identifications given in Table 1, along with an indication of the fiber coating, if any, present on the fibers reinforcing the sample. Also given are the peak temperature and pressure at which each sample is consolidated, the temperature at which each of the four-point bend tests was carried out, and fracture mode data generated during each test. For fracture mode, data is given concerning the mode of fracture, whether in shear (S), compression (C), tension (T), delamination (D) or a combination thereof. Also given is the fracture habit, whether fibrous (F), woody (W) or brittle (B).

TABLE 2

| Sample No. | Matrix/ Coating | Hot Press | Test Temp(°C.) | Fracture Mode Character |
|---|---|---|---|---|
| 1 | A/ No Coating | 1000° C. 1500 psi | 25 | S, C; F |
| | | | 500 | S; F |
| | | | 700 | S, C, D; F |
| | | | 800 | S; F-W, F |
| | | | 900 | S; F |
| 2 | A/ No Coating | 1200° C. 1500 psi | 25 | S, C; F |
| | | | 500 | S, C, D; F |
| | | | 700 | S, T, D; F |
| | | | 800 | S, T, C; B-W |
| | | | 900 | S, D; F |
| 3 | A/ BN Coating | 1100° C. 1500 psi | 25 | T, S; F |
| | | | 500 | S; F |
| | | | 700 | S; F |
| | | | 800 | S, C, T; B-W, F |
| | | | 900 | S; B-W, F |
| | | | 1000 | S; W, F |
| 4 | A/ BN Coating | 1200° C. 1500 psi | 25 | T, S; F |
| | | | 500 | S; W, F |
| | | | 700 | S; F |
| | | | 800 | S, T; B-W, F |
| | | | 900 | T, S; B-W, F |
| 5 | B/ No Coating | 1100° C. 1500 psi | 25 | C, S, T; F |
| | | | 500 | S, C, D; F |
| | | | 700 | S, C, T, D; F |
| | | | 800 | S, C, T; B-W |
| | | | 900 | S, C, D; F |
| 6 | B/ BN Coating | 1100° C. 1500 psi | 25 | T, S; F |
| | | | 500 | T, S; B-W, F |
| | | | 700 | T, S; B-W, F |
| | | | 800 | S; B-W, F |
| | | | 900 | T, S; B-W, F |
| 7 | B/ BN Coating | 1200° C. 1500 psi | 25 | T, S; W-F |
| | | | 500 | T, S; F |
| 8 | E/ No Coating | 1365° C. 315 psi | 25 | T, S; F |
| | | | 500 | T, S; W-F |
| 9 | E/ BN Coating | 1365° C. 315 psi | 25 | T, S; W-F |
| | | | 500 | T, S; W-F |
| | | | 1000 | Def; F |
| 10 | E/ BN Coating | 1365° C. 315 psi | 25 | T, S; F |
| | | | 500 | S; W, F |
| | | | 700 | Def, S; W, F |
| 11 | C/ No Coating | 1100° C. 1500 psi | 25 | S, T; F |
| | | | 500 | S, C, D; W, F |
| | | | 700 | S, C, D; F |
| | | | 900 | S, C, D; W, F |
| 12 | C/ BN Coating | 1200° C. 1500 psi | 25 | S, T; F |
| | | | 500 | S; F |
| | | | 700 | S; F |
| | | | 900 | S, C, D; F |
| 13 | C/ BN Coating | 1100° C. 1500 psi | 25 | T, S; W, F |
| | | | 500 | S; B-W, F |
| | | | 700 | S, C; B-W, F |
| | | | 900 | S; B-W, F |
| 14 | D/ No Coating | 1100° C. 1500 psi | 25 | S; F |
| | | | 500 | S; F |
| | | | 700 | S, C; F |
| | | | 900 | S, C; D, F |
| 15 | D/ | 1200° C. | 25 | S; F |

TABLE 2-continued

| Sample No. | Matrix/ Coating | Hot Press | Test Temp(°C.) | Fracture Mode Character |
|---|---|---|---|---|
| | No coating | 1500 psi | 500 | S; F |
| | | | 700 | S; F |
| | | | 900 | S, C; D, F |
| 16 | D/ BN Coating | 1100° C. 1500 psi | 25 | S, T; F |
| | | | 500 | S; W, F |
| | | | 700 | S, C; W, F |
| | | | 900 | S, C; D, W, F |
| 17 | D/ BN Coating | 1200° C. 1500 psi | 25 | S, T; F |
| | | | 500 | S, C, T; D, W |
| | | | 700 | S; W, F |
| | | | 900 | S, C; D, F |

The mechanical properties of the test samples reported in Table 2 are shown in Table 3 below. Included in Table 3 are stress and strain data for each of the flexural tests reported in Table 2, by Sample number and test temperature. The data comprises the microcrack yield point for stress ($S_{MCY}$) and strain ($E_{MCY}$), as well as measurements of the ultimate failure stress ($S_{ULT}$) and strain ($E_{ULT}$) for each sample. Stress values are reported in Ksi ($10^3$ psi) and strains as a percent (%).

TABLE 3

| Sample/ Matrix | Test Temp(°C.) | $S_{MCY}$ Ksi | $E_{MCY}$ (%) | $S_{ULT}$ Ksi | $E_{ULT}$ (%) |
|---|---|---|---|---|---|
| 1/A (No Coating) | 25 | 17.9 | 0.14 | 56.8 | 0.48 |
| | 500 | 29.3 | 0.24 | 57.7 | 0.50 |
| | 700 | 25.7 | 0.43 | 42.3 | 0.98 |
| | 800 | 27.2 | 0.43 | 50.5 | 0.98 |
| | 900 | 6.9 | 0.10 | 52.6 | 0.92 |
| 2/A (No Coating) | 25 | 13.8 | 0.10 | 55.1 | 0.48 |
| | 500 | 19.8 | 0.15 | 54.8 | 0.51 |
| | 700 | 24.0 | 0.38 | 43.0 | 0.86 |
| | 800 | 26.0 | 0.48 | 50.8 | 1.08 |
| | 900 | 5.0 | 0.08 | 42.1 | 0.81 |
| 3/A (BN Coating) | 25 | 22.7 | 0.16 | 59.2 | 0.46 |
| | 500 | 48.2 | 0.36 | 83.4 | 0.67 |
| | 700 | 57.2 | 0.43 | 51.1 | 0.61 |
| | 800 | 12.5 | 0.15 | 64.7 | 1.16 |
| | 900 | 13.4 | 0.21 | 44.9 | 0.91 |
| | 1000 | 8.1 | 0.12 | 38.0 | 0.67 |
| 4/A (BN Coating) | 25 | 36.2 | 0.25 | 80.9 | 0.66 |
| | 500 | 31.8 | 0.22 | 98.1 | 0.73 |
| | 700 | 45.1 | 0.36 | 72.1 | 0.66 |
| | 800 | 14.4 | 0.17 | 76.5 | 1.10 |
| | 900 | 12.5 | 0.13 | 49.0 | 0.77 |
| 5/B (No Coating) | 25 | 17.0 | 0.11 | 61.2 | 0.53 |
| | 500 | 24.8 | 0.19 | 74.1 | 0.62 |
| | 700 | 21.7 | 0.34 | 40.9 | 0.84 |
| | 800 | 18.1 | 0.29 | 30.0 | 0.61 |
| | 900 | 5.5 | 0.10 | 18.3 | 0.46 |
| 6/B (BN Coating) | 25 | 25.4 | 0.15 | 124.0 | 1.0 |
| | 500 | 53.5 | 0.35 | 79.5 | 0.55 |
| | 700 | 93.3 | 0.69 | 137.0 | 1.08 |
| | 800 | 17.9 | 0.17 | 63.7 | 0.75 |
| | 900 | 9.7 | 0.16 | 22.4 | 0.44 |
| 7/B (BN Coating) | 25 | 17.4 | 0.18 | 79.8 | 1.06 |
| | 500 | 12.4 | 0.12 | 70.8 | 1.12 |
| 8/E (No Coating) | 25 | 95.1 | 0.51 | 171.5 | 1.02 |
| | 500 | 59.5 | 0.40 | 152.3 | 1.22 |
| 9/E (BN Coating) | 25 | 85.1 | 0.99 | 132.2 | 1.59 |
| | 500 | 108.8 | 0.97 | 154.8 | 1.83 |
| | 1000 | 5.2 | 1.41 | 5.2 | 1.41 |
| 10/E (BN Coating) | 25 | 41.3 | 0.22 | 123.9 | 0.75 |
| | 500 | 65.3 | 0.39 | 102.3 | 0.61 |
| | 700 | 4.7 | 0.11 | 37.4 | 1.02 |
| 11/C (No Coating) | 25 | 23.3 | 0.17 | 40.0 | 0.37 |
| | 500 | 20.7 | 0.23 | 61.3 | 0.85 |
| | 700 | 21.4 | 0.44 | 36.1 | 0.88 |
| | 900 | 7.7 | 0.15 | 19.0 | 0.72 |
| 12/C (BN Coating) | 25 | 18.3 | 0.14 | 35.4 | 0.32 |
| | 500 | 30.1 | 0.25 | 43.3 | 0.37 |
| | 700 | 24.1 | 0.35 | 37.1 | 0.72 |

TABLE 3-continued

| Sample/ Matrix | Test Temp(°C.) | $S_{MCY}$ Ksi | $E_{MCY}$ (%) | $S_{ULT}$ Ksi | $E_{ULT}$ (%) |
|---|---|---|---|---|---|
| | 900 | 6.0 | 0.15 | 18.9 | 0.61 |
| 13/C (BN Coating) | 25 | 19.0 | 0.16 | 120.8 | 1.18 |
| | 500 | 21.3 | 0.21 | 53.9 | 1.32 |
| | 700 | 45.3 | 0.48 | 63.9 | 0.81 |
| | 900 | 12.0 | 0.16 | 35.6 | 0.54 |
| 14/D (No Coating) | 25 | 19.8 | 0.14 | 43.2 | 0.34 |
| | 500 | 29.5 | 0.26 | 44.8 | 0.41 |
| | 700 | 17.9 | 0.42 | 26.8 | 0.87 |
| | 900 | 14.2 | 0.27 | 38.2 | 0.95 |
| 15/D (No Coating) | 25 | 17.0 | 0.11 | 33.8 | 0.25 |
| | 500 | 19.3 | 0.19 | 33.7 | 0.37 |
| | 700 | 13.3 | 0.32 | 20.7 | 0.54 |
| | 900 | 9.7 | 0.16 | 27.8 | 0.55 |
| 16/D (BN Coating) | 25 | 22.9 | 0.20 | 127.8 | 1.06 |
| | 500 | 33.9 | 0.32 | 100.9 | 0.92 |
| | 700 | 32.6 | 0.35 | 62.6 | 0.73 |
| | 900 | 20.7 | 0.23 | 61.3 | 0.85 |
| 17/D (BN Coating) | 25 | 23.1 | 0.20 | 65.5 | 0.58 |
| | 500 | 75.3 | 0.61 | 105.3 | 1.15 |
| | 700 | 50.1 | 0.49 | 77.7 | 0.93 |
| | 900 | 8.7 | 0.10 | 34.8 | 0.54 |

A review of the data reported above in Tables 2 and 3 indicate that, in each of the systems in which BN coated carbon fibers were substituted for uncoated fibers, improvements in high temperature mechanical properties were obtained. For example, the samples made using matrix Composition A from Table 1 display a general increase in ultimate strength at test temperatures in the 500°-900° C. range when compared with uncoated samples. The observed increases are as high as 50% at some temperatures, with the majority of coated-fiber samples also displaying a substantial increase in microcrack point over the temperature range tested.

The BN coated carbon fiber composites with matrix Composition B also display increased ultimate strengths, both at room temperature and in the 700°-900° C. range, with particularly good 700° C. performance. Strain to failure values for the coated-fiber samples are also generally better than those for the uncoated fiber samples.

While the coated fiber composites prepared with the glass matrix material (Composition E from Table 1) did not show significant increases in ultimate strength, these samples did exhibit improved microcrack performance in several cases. The high failure strains for both fiber types in this system, observed at temperatures above about 500° C., are attributable largely to glass flow at these temperatures.

Although the coated fiber sample made with matrix Composition C and consolidated at 1200° C. did not exhibit improved properties, the sample consolidated at 1100° C. demonstrated a 3-fold increase in room temperature flexural strength and failure strain compared to that for the similarly consolidated uncoated fiber composite. Ultimate and microcrack strengths shown by the 1100° C. sample at 700°-900° C. test temperatures were also considerably improved.

Particularly strong gains in ultimate stress and strain performance were demonstrated by the coated fiber samples made with matrix Composition D from Table 1. These improvements were seen at all test temperatures, in some cases yielding two to three times the performance of the uncoated fiber samples.

Even beyond the immediate mechanical properties enhancements observed during the flexural stress/strain testing program described, the composites of the invention are also expected to provide substantially better long term utility for use in air at temperatures in the 700°-900° C. range. Hence, whereas graphite fibers alone begin to oxidize at 450°-500° C. temperatures, BN-coated graphite fibers offer potential oxidation performance closely reflecting the 900° C. oxidative stability of the BN coating moiety. Also, the probable formation of $B_2O_3$ at the BN/matrix interface in these composites, developed at temperatures above about 500° C., contributes to a crack blunting mechanism which is beneficial to ultimate failure strain and to composite toughness. Thus the improved performance of our BN-coated graphite-fiber-reinforced composites during prolonged exposure to high temperature air or other oxidizing environments represents a significant advance in the art.

We claim:

1. A ceramic matrix composite article comprising a matrix phase composed of a glass or glass-ceramic and a matrix reinforcement material disposed within the matrix which includes inorganic reinforcing fibers, wherein the inorganic reinforcing fibers comprise a multiplicity of carbon fibers having a boron nitride surface coating thereon; and the matrix is selected from the group consisting of alkali borosilicate glasses, aluminosilicate glasses, boroaluminosilicate glasses, and aluminosilicate glass-ceramics.

2. A ceramic matrix composite article in accordance with claim 1 wherein the matrix is selected from the group consisting of alkali borosilicate, alkaline earth aluminosilicate, and boroaluminosilicate glasses, and wherein said glasses contain up to 25% alkaline earth oxides and not more than 10% alkali metal oxides by weight.

3. A ceramic matrix composite article in accordance with claim 1 wherein the matrix consists essentially of a glass-ceramic selected from the group consisting of $\beta$-spodumene, anorthite and cordierite glass-ceramics.

4. A ceramic matrix composite article in accordance with claim 1 wherein the matrix is a calcium aluminosilicate glass-ceramic comprising a principal crystal phase of anorthite alone or in combination with mullite, cordierite, barium osumilite, albite solid solution, and gehlenite.

5. A ceramic matrix composite article in accordance with claim 1 wherein the matrix is a calcium aluminosilicate glass-ceramic comprising a principal crystal phase of anorthite and alpha alumina.

6. A ceramic matrix composite article in accordance with claim 1 wherein the matrix is a barium aluminosilicate glass-ceramic comprising a principal crystal phase of barium osumilite.

7. A ceramic matrix composite article in accordance with claim 1 wherein the carbon fibers are graphite fibers.

8. A ceramic matrix composite article in accordance with claim 7 wherein the boron nitride surface coating is a vapor-deposited coating having a thickness in the range of about 0.05-1.0 microns.

9. A ceramic matrix composite article in accordance with claim 8 wherein the boron nitride coating has a thickness in the range of about 0.1-0.2 microns.

10. A ceramic matrix composite article in accordance with claim 7 wherein the matrix further includes an additional reinforcing constituent selected from the group consisting of inorganic whiskers or chopped fibers of silicon carbide, alumina, or mullite.

11. A method for improving the oxidation resistance of a composite material comprising a glass or glass-ceramic matrix and a matrix reinforcement material consisting of carbon fibers, which method comprises applying a boron nitride surface coating to the surfaces of the fibers.

12. A method in accordance with claim 11 wherein the carbon fibers are graphite fibers.

13. A method in accordance with claim 12 wherein the matrix is a glass selected from the group consisting of alkali borosilicate, alkaline earth aluminosilicate, and boroaluminosilicate glasses, and wherein said glasses contain up to 25% alkaline earth oxides and not more than 10% alkali metal oxides be weight.

14. A method in accordance with claim 12 wherein the matrix consists essentially of a glass-ceramic selected from the group consisting of $\beta$-spodumene, anorthite and cordierite glass-ceramics.

15. A method in accordance with claim 12 wherein the boron nitride surface coating is a vapor-deposited coating having a thickness in the range of about 0.05-1.0 microns.

16. A method in accordance with claim 15 wherein the boron nitride coating has a thickness in the range of about 0.1-0.2 microns.

17. A method for protecting a carbon component encapsulated with an oxide glass or glass-ceramic from oxidative deterioration at temperatures above 500° C. which comprises the step of interposing a layer of boron nitride between the carbon component and the oxide glass or glass-ceramic encapsulating material.

18. A method in accordance with claim 17 wherein the carbon component is a graphite component.

* * * * *